(12) United States Patent
Hashimoto et al.

(10) Patent No.: US 11,978,354 B2
(45) Date of Patent: May 7, 2024

(54) INTERMEDIATION DEVICE AND INTERMEDIATING METHOD

(71) Applicant: KAWASAKI JUKOGYO KABUSHIKI KAISHA, Hyogo (JP)

(72) Inventors: Yasuhiko Hashimoto, Kobe (JP);
Masayuki Kamon, Akashi (JP);
Shigetsugu Tanaka, Akashi (JP);
Yoshihiko Maruyama, Osaka (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 394 days.

(21) Appl. No.: 17/266,870

(22) PCT Filed: Aug. 9, 2019

(86) PCT No.: PCT/JP2019/031646
§ 371 (c)(1),
(2) Date: Feb. 8, 2021

(87) PCT Pub. No.: WO2020/032257
PCT Pub. Date: Feb. 13, 2020

(65) Prior Publication Data
US 2021/0291382 A1    Sep. 23, 2021

(30) Foreign Application Priority Data

Aug. 10, 2018    (JP) .................................. 2018-151917
Jun. 5, 2019    (JP) .................................. 2019-105753

(51) Int. Cl.
B25J 9/16        (2006.01)
A63F 13/25    (2014.01)
(Continued)

(52) U.S. Cl.
CPC .............. *G09B 19/00* (2013.01); *A63F 13/25* (2014.09); *A63F 13/50* (2014.09); *A63F 13/67* (2014.09);
(Continued)

(58) Field of Classification Search
CPC .......... G09B 19/00; G09B 19/24; G09B 5/02; G09B 9/00; G09B 19/16; A63F 13/25;
(Continued)

(56) References Cited

U.S. PATENT DOCUMENTS 6,093,100 A * 7/2000 Singer ................. G07F 17/3293
273/460
2003/0201982 A1* 10/2003 Iesaka ................... G06F 3/0213
345/168
(Continued)

FOREIGN PATENT DOCUMENTS

JP        H10-099558 A    4/1998
JP        2001-087559 A    4/2001
(Continued)

OTHER PUBLICATIONS

Andersson, Russell L., "Aggressive Trajectory Generator for a Robot Ping-Pong Player", IEEE Control Systems Magazine, Feb. 1989, vol. 9, issue 2, pp. 15-20.

*Primary Examiner* — Harry Y Oh
(74) *Attorney, Agent, or Firm* — Studebaker & Brackett PC

(57) ABSTRACT

An intermediation device and an intermediating method, capable of improving public interest in an industrial robot compared to before, are provided. The intermediation device is adapted to execute processings of receiving, from at least two manipulation terminals, or from at least one manipulation terminal and at least one computer, manipulation signals for manipulating at least two industrial robots each corre- (Continued)

sponding to the manipulation terminal or the computer and configured to perform a given work or a given game, causing the at least two industrial robots to perform the given work or the given game based on the manipulation signals, and causing a display unit held by an operator of the manipulation terminal to display an image of a site of the work or the game performed by the at least two industrial robots, the image being captured by an imaging device.

17 Claims, 6 Drawing Sheets

(51) Int. Cl.

| | | |
|---|---|---|
| *A63F 13/50* | (2014.01) | |
| *A63F 13/67* | (2014.01) | |
| *B25J 9/00* | (2006.01) | |
| *B25J 13/00* | (2006.01) | |
| *B25J 13/02* | (2006.01) | |
| *B25J 13/06* | (2006.01) | |
| *B25J 13/08* | (2006.01) | |
| *B25J 19/02* | (2006.01) | |
| *G09B 19/00* | (2006.01) | |

(52) U.S. Cl.
CPC ........... *B25J 9/0081* (2013.01); *B25J 9/1605* (2013.01); *B25J 9/161* (2013.01); *B25J 9/163* (2013.01); *B25J 9/1661* (2013.01); *B25J 9/1671* (2013.01); *B25J 9/1697* (2013.01); *B25J 13/006* (2013.01); *B25J 13/02* (2013.01); *B25J 13/06* (2013.01); *B25J 13/065* (2013.01); *B25J 13/082* (2013.01); *B25J 13/088* (2013.01); *B25J 19/021* (2013.01)

(58) Field of Classification Search
CPC ........ A63F 13/50; A63F 13/67; A63F 13/213; A63F 13/32; A63F 13/33; A63F 13/833; A63F 13/98; A63F 13/65; B25J 9/0081; B25J 9/1605; B25J 9/161; B25J 9/163; B25J 9/1661; B25J 9/1671; B25J 9/1697; B25J 13/006; B25J 13/02; B25J 13/06; B25J 13/065; B25J 13/082; B25J 13/088; B25J 19/021; B25J 3/00; B25J 19/00

See application file for complete search history.

(56) References Cited

U.S. PATENT DOCUMENTS

| | | | |
|---|---|---|---|
| 2008/0146333 A1* | 6/2008 | Kando | A63F 13/12 463/43 |
| 2009/0291764 A1* | 11/2009 | Kirkman | G06F 3/033 463/43 |
| 2012/0238366 A1* | 9/2012 | Tedder | A63F 3/00643 463/42 |
| 2016/0107084 A1* | 4/2016 | Kuri | A63F 13/332 463/42 |
| 2017/0173464 A1* | 6/2017 | Fujisawa | A63F 13/25 |
| 2018/0256989 A1* | 9/2018 | Adekunle | A63F 13/2145 |
| 2018/0341277 A1* | 11/2018 | Yang | A63F 13/48 |
| 2018/0370025 A1* | 12/2018 | Didey | B25J 9/102 |

FOREIGN PATENT DOCUMENTS

| | | | |
|---|---|---|---|
| JP | 2001-178960 | * | 7/2001 |
| JP | 2001-178960 A | | 7/2001 |
| JP | 3286665 B2 | * | 5/2002 |
| JP | 2003-265852 A | | 9/2003 |
| JP | 2009-000286 A | | 1/2009 |
| JP | 2009-213754 A | | 9/2009 |
| JP | 2015-173978 | * | 5/2015 |
| JP | 2015-173978 A | | 10/2015 |
| TW | I487399 B | | 6/2015 |

\* cited by examiner (a)

(b)

(a)

(b)

INTERMEDIATION DEVICE AND INTERMEDIATING METHOD

TECHNICAL FIELD

The present disclosure relates to an intermediation device and an intermediating method which cause industrial robots to operate based on operations of manipulation terminals by a plurality of operators, respectively.

BACKGROUND ART

Conventionally, a game system in which a plurality of operators operate controllers to cause corresponding robots to fight against each other, is known (e.g., see Patent Document 1). In a game system disclosed in Patent Document 1, a plurality of operators remotely manipulate robots having the same structure using controllers, respectively, and cause the robots to fight against each other in a circular battle field with a diameter of about 5 m.

The robot of the game system is provided with a superiority-and-inferiority determining part. This superiority-and-inferiority determining part monitors all the time whether a physical energy value calculated by a physical-energy-value calculating part becomes zero, and whether a limit time has lapsed. When the physical energy value of the robot is detected to be zero, the superiority-and-inferiority determining part determines that the robot is defeated.

REFERENCE DOCUMENT OF CONVENTIONAL ART

Patent Document

[Patent Document 1] JP2009-000286A

DESCRIPTION OF THE DISCLOSURE

Problem to be Solved by the Disclosure

Meanwhile, in recent years, labor shortage at companies etc., has been a problem, and accordingly, labor saving and automation are demanded. In this respect, industrial robots are gathering people's expectations. The industrial robots can compensate the shortage of labors in many industries. Therefore, such industrial robots are demanded to be spread, and in order to achieve this, public interest in the industrial robots needs to be enhanced. However, the conventional system merely determines the superiority and inferiority in the game, and is unlikely to achieve the improvement in people's interest in the industrial robots.

Therefore, one purpose of the present disclosure is to provide an intermediation device and an intermediating method, capable of improving public interest in an industrial robot compared to before.

SUMMARY OF THE DISCLOSURE

An intermediation device according to the present disclosure executes processing of receiving, from at least two manipulation terminals, or from at least one manipulation terminal and at least one computer, manipulation signals for manipulating at least two industrial robots each corresponding to the manipulation terminal or the computer and configured to perform a given work or a given game. The device executes processings of causing the at least two industrial robots to perform the given work or the given game based on the manipulation signals, and causing a display unit held by an operator of the manipulation terminal to display an image of a site of the work or the game performed by the at least two industrial robots, the image being captured by an imaging device.

According to the present disclosure, the operator can cause the industrial robot to perform the work or the game by remotely manipulating the industrial robot by the own manipulation terminal while visually recognizing the image (including a still image and a video) of the site of the work or the game by the industrial robot displayed on the display unit. Therefore, the operator can manipulate the industrial robot at home, outside the home, etc., as if the industrial robot is located near the operator. Accordingly, public interest in the industrial robots can be improved compared to before. As a result, the number of people who manipulate the industrial robot increases, and the spread of the industrial robot is expected to be accelerated.

In the present disclosure, the intermediation device may determine a manipulation level of the operator based on a given evaluation element.

According to this configuration, a manipulation skill of the operator can be grasped. Therefore, an operator with a high-level skill in the manipulation of the industrial robot can be easily secured, and a business model of offering a work of remotely manipulating the robot to such a skilled operator, can also be established.

In the present disclosure, the intermediation device may receive an evaluation from a game observing device configured to evaluate the work or the game performed by the industrial robot, and determine a manipulation level of the operator based on the evaluation.

According to this configuration, since the quality of the result of the work (e.g., a painting work) performed by the industrial robot may be sensed differently between people, the manipulation level of the operator can be diversely determined based on such evaluations. Moreover, by the work being opened to the public and observed, public interest in robots and in the robot manipulation can be improved.

In the present disclosure, the intermediation device may cause the display unit of the operator to display a host screen configured to invite participation in the work or the game.

According to this configuration, the operator can easily participate in the work or the game performed by the industrial robot by visually recognizing the indication on the display unit.

In the present disclosure, the intermediation device may accept participation of the operator in the work or the game, and connect the manipulation terminal to the industrial robot.

According to this configuration, the operator can freely participate in the work or the game performed by the industrial robot when he/she wants.

In the present disclosure, the intermediation device may disconnect the manipulation terminal of the operator from the industrial robot according to a contact from the manipulation terminal.

According to this configuration, by the operator informing to the intermediation device, he/she can leave the remote manipulation whenever he/she wants.

In the present disclosure, the intermediation device may cause the display unit to display an image of the site including all of the industrial robots.

According to this configuration, the operator can visually recognize the work progress or the game situation of the robot of a competitor.

In the present disclosure, the intermediation device may receive the manipulation signal from a game device to which a controller is connected, as the manipulation terminal.

According to this configuration, the operator does not need to buy a manipulation terminal for exclusive use, and can easily manipulate the robot remotely from home etc.

An intermediating method according to the present disclosure includes the step of receiving, from at least two manipulation terminals, or from at least one manipulation terminal and at least one computer, manipulation signals for manipulating at least two industrial robots each corresponding to the manipulation terminal or the computer and configured to perform a given work or a given game. The method includes the steps of causing the at least two industrial robots to perform the given work or the given game based on the manipulation signals, and causing a display unit held by an operator of the manipulation terminal to display an image of a site of the work or the game performed by the at least two industrial robots, the image being captured by an imaging device.

An intermediation device according to the present disclosure includes a receiver configured to receive, from at least two manipulation terminals, or from at least one manipulation terminal and at least one computer, manipulation signals for manipulating at least two industrial robots each corresponding to the manipulation terminal or the computer and configured to perform a given work or a given game. The device includes an executer configured to cause the at least two industrial robots to perform the given work or the given game based on the manipulation signals, and a display configured to cause a display unit held by an operator of the manipulation terminal to display an image of a site of the work or the game performed by the at least two industrial robots, the image being captured by an imaging device.

Effect of the Disclosure

According to the present disclosure, an intermediation device and an intermediating method, capable of improving public interest in an industrial robot compared to before, can be provided.

MODES FOR CARRYING OUT THE DISCLOSURE

Hereinafter, a robot manipulation system having an intermediation device according to one embodiment of the present disclosure is described with reference to the drawings. The intermediation device described below is merely one embodiment of the present disclosure. Therefore, the present disclosure is not limited to the following embodiment, and it can be added, omitted, or changed without departing from the spirit of the present disclosure.

Although in this embodiment a mode in which a configuration and functions of the intermediation device are assigned to the server device is described, the assignment is not limited to this. The configuration and functions of the intermediation device may be assigned to a game device held by an operator, or may be assigned to an industrial robot.

In a robot manipulation system 1 of this embodiment, at least two operators (e.g., players of a game) remotely manipulate industrial robots using controllers connected to one of various known game devices via a communication network, respectively, and cause the corresponding industrial robots to compete against each other for performing a given work.

The given work may be, for example, a painting work as will be described later, or other than that, it may be a picking work, a dishing up work in a Bento box, or a welding work. The given work may be any work, as long as a part of the process includes a work (a work using a human body or intelligence for a certain purpose based on a certain plan).

Figure 1:
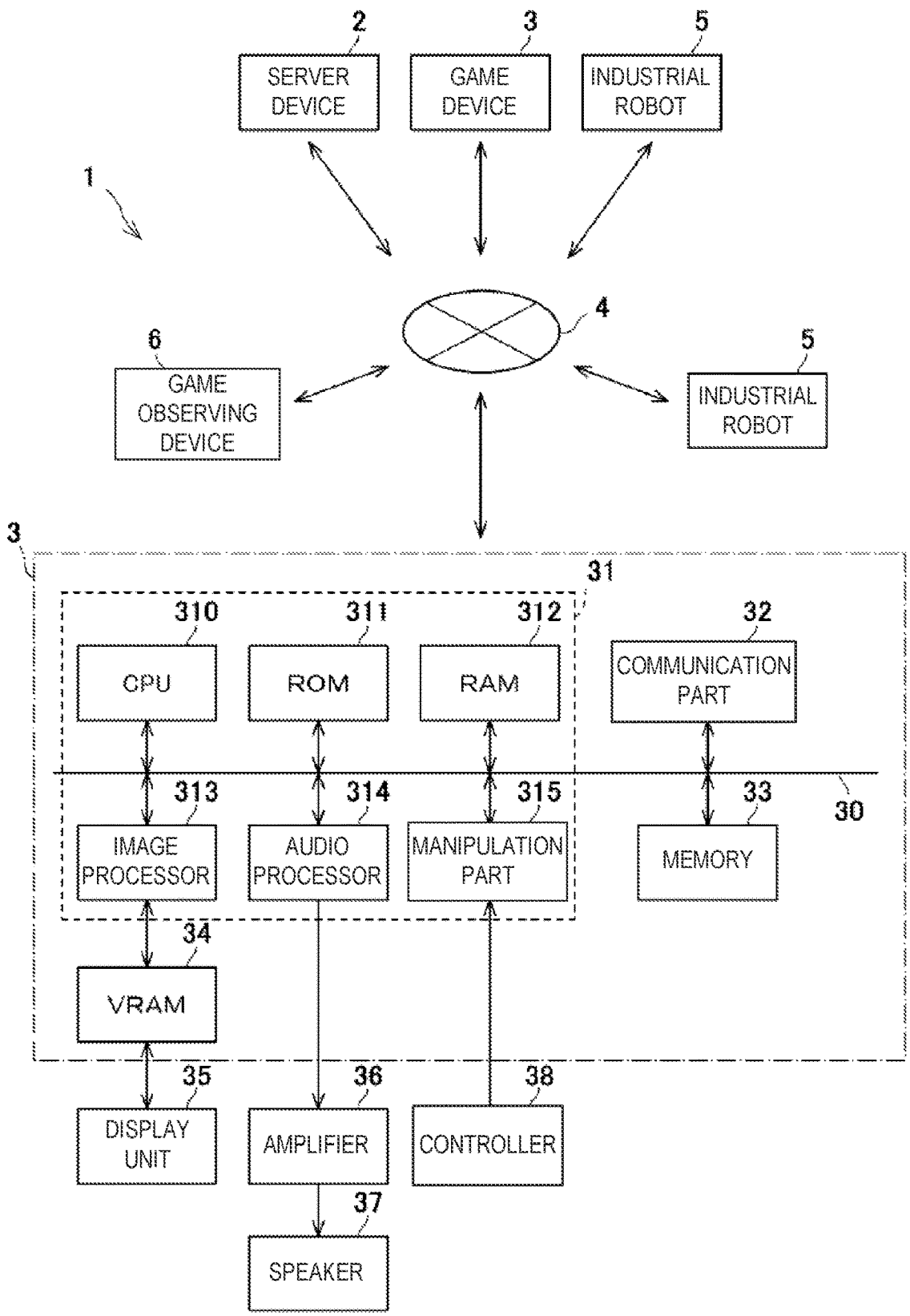
FIG. 1 is a block diagram illustrating a configuration of a robot manipulation system according to one embodiment of the present disclosure.

FIG. 1 is a block diagram illustrating a configuration of the robot manipulation system 1 according to this embodiment. The robot manipulation system 1 includes a server device (corresponding to an "intermediation device") 2, at least two game devices 3, at least two industrial robots 5, and one or more game observing device(s) 6, which are mutually communicable via a communication network 4, such as the internet and LAN. The industrial robot 5 is comprised of an industrial robot, such as a vertical articulated robot, a horizontal articulated robot, a parallel link robot, a polar coordinates robot, a cylindrical coordinates robot, and a rectangular coordinates robot, and has a wireless communication function, such as an antenna. Note that the number of the game devices 3 and the number of the industrial robots 5 are the same.

The game device 3 has a communication part 32, such as internet communication, and is connectable to the communication network 4. The game device 3 is, for example, a stationary-type game device or a mobile game device. The game device 3 to which a controller 38 (described later) is connected corresponds to a "manipulation terminal." The manipulation terminal includes, in addition to various known game devices, a personal data assistant (PDA), a smart phone, a personal computer, a tablet, and a remote manipulator dedicated for a robot.

As illustrated in FIG. 1, the game device 3 is provided with, on a bus 30, a controlling part 31, the communication part 32, and a memory 33, such as a hard disk or a memory card. The controlling part 31 causes the industrial robot 5 to operate via the communication network 4 based on manipulation of the controller 38 (described later), and causes the industrial robot 5 to perform the given work. The controlling part 31 is provided with a CPU 310, a ROM (a flash memory) 311, a RAM 312, an image processor 313, an audio processor 314, and a manipulation part 315.

The CPU 310 controls operation of each part of the game device 3. The ROM 311 stores a basic program etc., of the game device 3. The memory 33 stores a program (a remote manipulation program) for operating the robot by a remote manipulation, a program (a game program) for executing each kind of game, etc. A working area used when the CPU 310 executes the game program is set for the RAM 312. Note that although in this embodiment the remote manipulation program is essential to be stored, the game program is not essential.

The image processor 313 is provided with a GPU (Graphics Processing Unit) which can generate a game screen. A video RAM (VRAM) 34 is connected to the image processor 313, and a display unit 35 is connected to the VRAM 34. The display unit 35 acquires, via the communication part 32, a video and a still image of the site where the plurality of industrial robots work, which are captured by an imaging device CA (described later), and displays them. Note that the image processor 313 generates a game space according to a command of the CPU 310. The display unit 35 also has a function to display an image in the game space as a game screen.

The audio processor 314 is provided with a DSP (Digital Signal Processor) which generates game sound. The audio processor 314 sends the generated game sound to an amplifier 36 including a D/A converter. The amplifier 36 amplifies this sound signal and transmits it to a speaker 37. The controller 38 is connected to the manipulation part 315. The controller 38 includes a cross button, a push switch, a joystick, a mouse, a keyboard, and a touch panel. Moreover, the manipulation part 315 detects a signal of manipulation by a user via the controller 38, and transmits the manipulation signal to the CPU 310.

The communication part 32 communicates with the industrial robot 5 via the communication network 4. By the operator operating the own controller 38, the controlling part 31 outputs an operation command to the industrial robot 5 via the communication part 32. Accordingly, the industrial robot 5 can be remotely manipulated by the operator operating the controller 38.

Moreover, the controlling part 31 progresses the game or downloads the game program by executing data communication between the game device 3 and the server device 2.

Figure 2:
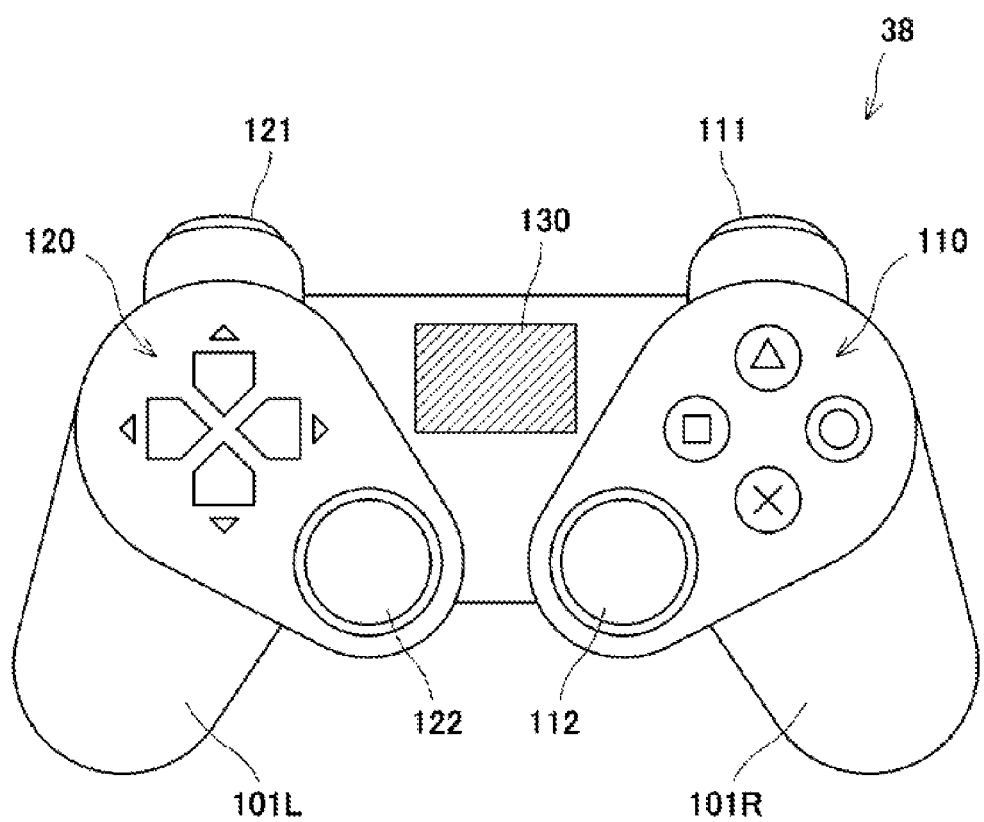
FIG. 2 is an outline view of a controller connected to a game device illustrated in FIG. 1.

FIG. 2 is an outline view of the controller 38 connected to the game device 3 illustrated in FIG. 1. As illustrated in FIG. 2, the controller 38 has a substantially U-shape. The operator operates while gripping handles 101L and 101R at both wing parts with both his/her left and right hands. Operation button groups 120 and 110, and analog sticks 122 and 112 are provided in left and right upper surfaces of the controller 38, and an L1 button 121 and an R1 button 111 are provided in left and right front surfaces of the controller 38, respectively. The operation button group 110 and the analog stick 112 are operated with the operator's right-hand thumb, and the operation button group 120 and the analog stick 122 are operated with the operator's left-hand thumb. Moreover, the R1 button 111 and the L1 button 121 are operated with the operator's right-hand index finger and left-hand index finger, respectively. The controller 38 is further provided with a touchpad 130 between the operation button group 110 and the operation button group 120.

Figure 3:
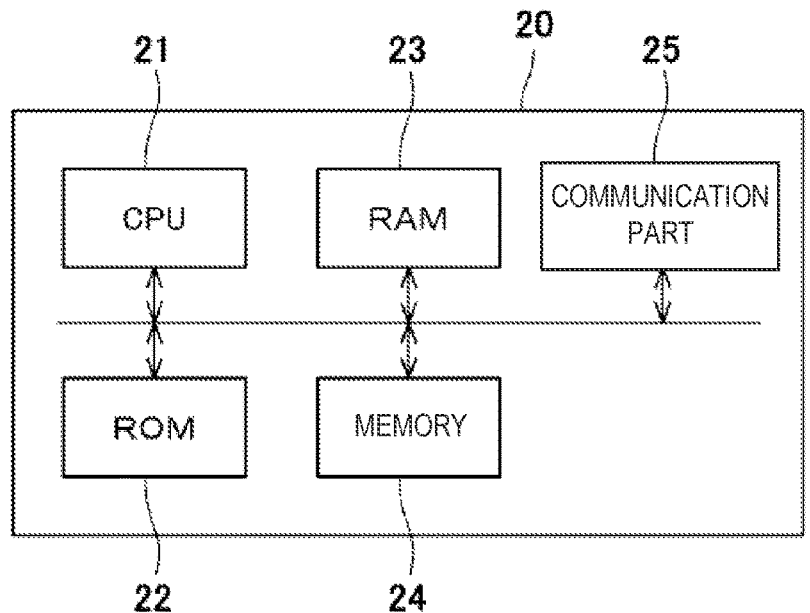
FIG. 3(a) is a block diagram illustrating a configuration of a controlling part of a server device illustrated in FIG. 1.
FIG. 3(b) is a block diagram illustrating a functional configuration of the controlling part of FIG. 3(a).
Figure 3:
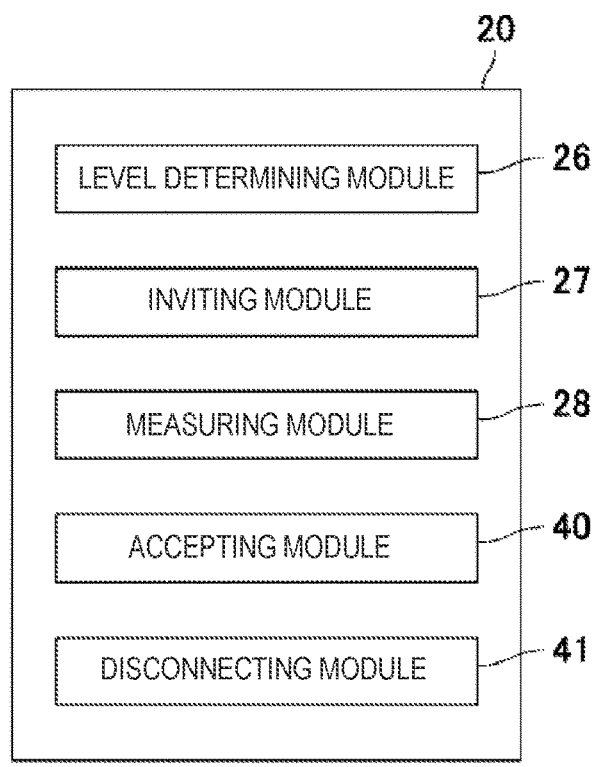

As illustrated in FIG. 3(a), the server device 2 is provided with a controlling part 20 comprised of, for example, a microcontroller, an MPU, an FPGA (Field Programmable Gate Array), a PLC (Programmable Logic Controller), a computer, or a personal computer. Such a controlling part 20 is provided with a CPU 21, a ROM 22, a RAM 23, a memory 24, and a communication part 25. The CPU 21 controls operation of each part of the server device 2. The ROM 22 stores a basic program of the server device 2, etc. The memory 24 stores, for example, a program for functionally implementing a level determining module 26, an inviting module 27, a measuring module 28, an accepting module 40, and a disconnecting module 41. Note that the controlling part 20 may be comprised of a sole processor which executes a centralized control, or a plurality of processors which execute a distributed control. Moreover, the level determining module 26, the inviting module 27, the measuring module 28, the accepting module 40, and the disconnecting module 41 may be implemented by hardware using a logic circuit etc., or may be implemented by combining the software and the hardware using the logic circuit etc., as described above.

As illustrated in FIG. 3(b), the controlling part 20 of the server device 2 has, as functional configurations, the level determining module 26, the inviting module 27, the measuring module 28, the accepting module 40, and the disconnecting module 41. The level determining module 26, the inviting module 27, the measuring module 28, the accepting module 40, and the disconnecting module 41 are functionally implemented by the controlling part of the server device 2 cooperatively operating with a given program stored in the memory 24.

Figure 4:
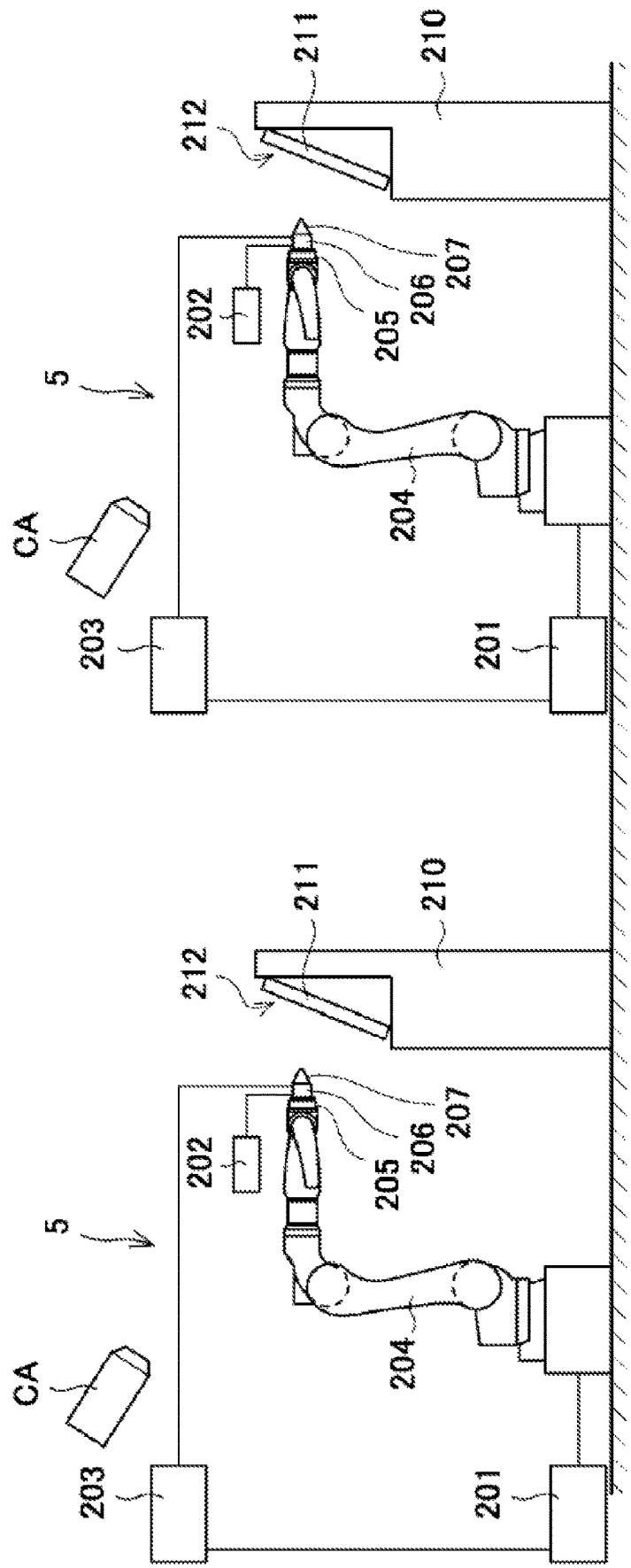
FIG. 4 is a view illustrating a situation in which two robots compete with each other for a painting work.

Here, as illustrated in FIG. 4, a case where for example two industrial robots 5 perform a painting work as the given work, and compete with each other for time required from the start of the work to the end of the work, is described.

Each industrial robot 5 is provided with a painting gun 206 which is a painting device body, a manipulator 204 which is a moving device, a supplying device 202 which supplies to the painting gun 206, liquid, such as paint, to be discharged from a nozzle 207 (described later), and a control device (a robot controller) 201 which controls operation of the manipulator 204. Moreover, a placing stand 210 on which a workpiece 211 is placed is disposed near the industrial robot 5. Note that a surface 212 of the workpiece 211 may be made of a material including a color-changeable substance, and water as the liquid may be discharged from the nozzle 207 of the painting gun 206 to the surface 212 of the workpiece 211 so that a part of the surface 212 wet by the water is changed in color and painted.

The control device 201 is provided with a processor, which executes decoding, arithmetic processing, etc., of a stored program and various signals inputted from externally, and is configured to control the operation of the manipulator 204 and output signals from various output ports.

The painting gun 206 is attached to a wrist 205 of the manipulator 204. The nozzle 207 constitutes a tip-end part of the painting gun 206, and the paint is discharged therefrom. A driving device 203 controls ON and OFF of discharging the paint from the nozzle 207 of the painting gun 206, and also controls an amount of the discharge. This driving device 203 is controlled by the control device 201.

The workpiece 211 to be painted is placed on the placing stand 210. By the operation of the manipulator 204, the nozzle 207 discharges the paint to the surface 212 of the workpiece 211 while moving near the surface 212. Thus, the surface 212 of the workpiece 211 is painted.

The two industrial robots 5 which perform the work, such as the painting work as described above, are disposed closely to each other. Moreover, the site where the two industrial robots 5 are caused to work is captured by the imaging devices CA, such as cameras. Note that although in FIG. 4 the imaging device CA is installed corresponding to each industrial robot 5, the site where the two industrial robots 5 perform the painting work may be imaged by a single imaging device CA.

Figure 5:
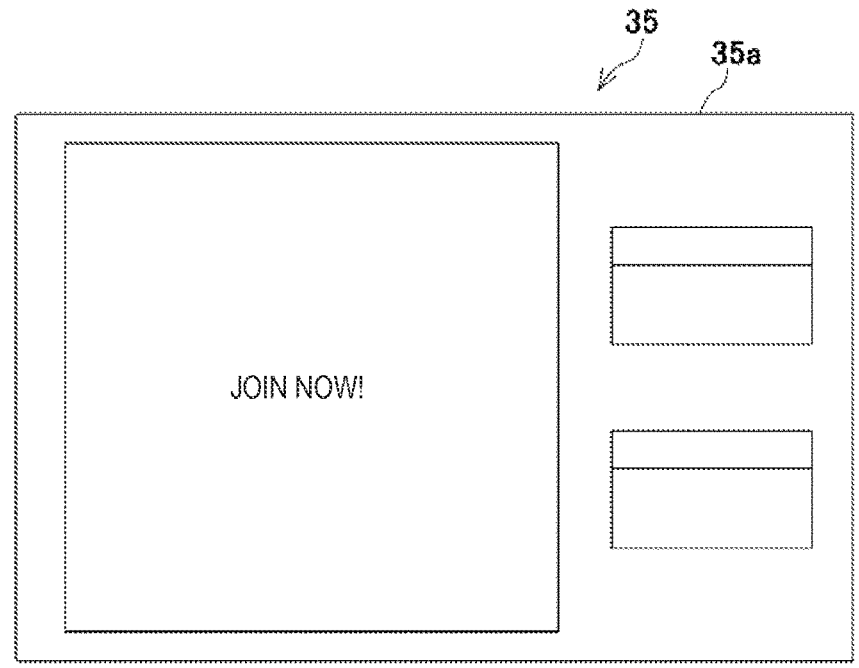
FIG. 5(a) is a view illustrating one example of a participation invitation indication displayed on a display unit of an operator.
FIG. 5(b) is a view illustrating a site of the painting work displayed on the display unit of the operator.
Figure 5:
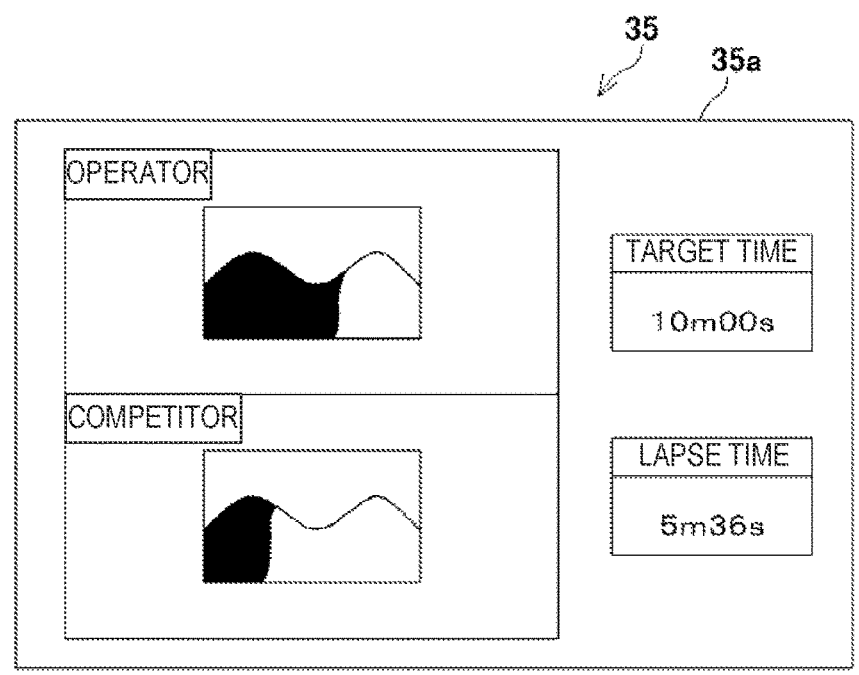

When the industrial robots 5 compete for the painting work as described above, first, the inviting module 27 of the server device 2 causes the display unit 35 of the game device 3 of the operator to display invitation for participation in the work. In this case, for example as illustrated in FIG. 5(*a*), a message for inviting the operator to participate in the work, such as "JOIN NOW!" is displayed on a display screen 35*a* of the display unit 35. Note that, as described above, since the robot manipulation system 1 according to this embodiment is to cause the industrial robots 5 to compete with each other for performing the given work, the above message is displayed when there are at least two operators who connect the own game devices 3 to the communication network 4. Note that the server device 2 may be configured to send the above message to the game device 3 by other measures, such as an email.

Each operator visually recognizes the display screen 35*a* of the display unit 35, and when participating in the painting work by the industrial robot 5, the operator performs a given operation to the controller 38 so as to transmit to the server device 2 a signal indicating that he/she wants to participate. The accepting module 40 of the server device 2 accepts the participation of the operator in the work, and connects the game device 3 to the industrial robot 5 via the communication network 4. In this case, the server device 2 may assign a given ID to the operator, and store the correspondence between the operator and the ID. The operator can participate by inputting the ID. After the game device 3 of each operator is connected to the industrial robot 5 via the communication network 4, the operator can cause the corresponding industrial robot 5 to perform the painting work by operating the controller 38. In this case, the measuring module 28 of the server device 2 measures time taken from the start of the work to the end of the work. Moreover, the controlling part 20 of the server device 2 displays a lapse time from the start of the work to the current time measured by the measuring module 28 on the display screen 35*a* of the display unit 35 as will be described later. Note that the control device (the robot controller) 201 of the industrial robot 5 controls each operation of the industrial robot 5 based on an operation signal converted from a signal according to the operation of the controller 38. Therefore, the operator can cause the industrial robot 5 to operate in the painting work by operating the controller 38.

While the industrial robots 5 compete for the painting work, each display unit 35 displays videos of the worksite including all of the industrial robots 5 (two industrial robots 5 in this embodiment). In detail, as illustrated in FIG. 5(*b*), a video of the worksite of the industrial robot 5 corresponding to the own game device 3, as well as a video of the worksite of the industrial robot 5 corresponding to a competitor's game device 3, captured by the imaging devices CA, are displayed on the display screen 35*a* of the display unit 35. FIG. 5(*b*) illustrates an example in which a progress of the painting work of the industrial robot 5 corresponding to the own game device 3 is faster than a progress of the painting work of the industrial robot 5 corresponding to the competitor's game device 3. Moreover, on the display screen 35*a* of the display unit 35, a target time for finishing the painting work, and the lapse time from the start of the work to the current time may be displayed. Note that, on the display screen 35*a* in FIG. 5(*b*), images of the industrial robot 5 and the placing stand 210 captured by the imaging device CA are omitted to be displayed.

When each industrial robot 5 finishes the painting work, the level determining module 26 determines a manipulation level of the operator based on a given evaluation element related to the painting work of the industrial robot 5. As the evaluation element, in an example of the work such as the painting work, the time required to finish the work, a quality of work result, etc., may be adopted. The quality of the result of the painting work includes coloring and brightness of the painting, a degree of painting beyond a border-line, etc.

Moreover, although the manipulation level of the operator is determined by the level determining module 26 as described above, in addition to this configuration, the one or more game observing device(s) 6 connectable to the server device 2 via the communication network 4 may be provided as illustrated in FIG. 1. This game observing device 6 is comprised of a device having a display part which can display the video of the working state of the industrial robot 5, such as any of a personal data assistant (PDA), a smartphone, a personal computer, and a tablet, or a simple input device. In this configuration, for example, viewers at a location far from the worksite or observers gathering at the worksite can give points (evaluations) to the result of the painting work of the industrial robot 5 by using the game observing devices 6. The points may be transmitted to the server device 2, and the level determining module 26 may determine the manipulation level of the operator based on the evaluations. Since the quality of the result of the painting work performed by the industrial robot 5 may be sensed differently between people, the manipulation level of the operator can be diversely determined based on such evaluations. Moreover, by the work being opened to the public and observed, public interest in the robot and in the robot manipulation can be improved.

Moreover, for example, a plurality of manipulation levels associated with time spans required for the painting work may be stored in advance in the memory 24. In this case, the level determining module 26 certifies a concrete manipulation level to a winner, and also certifies a concrete manipulation level to a loser. That is, the given manipulation level may be certified not only to the winner but also to the loser.

The disconnecting module 41 disconnects the game device 3 of the operator from the industrial robot 5 in response to a contact from the game device 3.

As described above, according to the server device 2 of the robot manipulation system 1 in this embodiment, the operator can cause the industrial robot 5 to perform the work by remotely manipulating the industrial robot 5 by the own controller 38 while visually recognizing the images (including the still image and the video) of the worksite of the industrial robot displayed on the display unit 35. Therefore, the operator can manipulate the industrial robot 5 at home, outside the home, etc., as if the industrial robot is located near the operator. Accordingly, the interest in the industrial robot can be improved compared to before. As a result, the number of people who manipulate the industrial robot 5 increases, and the spread of the industrial robot 5 is expected to be accelerated.

Moreover, in this embodiment, since the manipulation level of the operator is determined based on the given evaluation element, the manipulation skill of the operator can be grasped. Therefore, an operator with a high-level skill in the manipulation of the industrial robot 5 can be easily secured, and a business model of offering a work of remotely manipulating the robot to such a skilled operator, can also be established.

Moreover, in this embodiment, since the server device 2, which is the intermediation device, has the level determining module 26, information on the operators who can manipulate the industrial robot 5 at high skill can be easily collected.

Moreover, in this embodiment, since the videos of the site including all the industrial robots 5 are displayed on the display unit 35, the operator can visually recognize the work progress of the industrial robot 5 of the competitor. Therefore, the operator can be expected to improve his/her concentration and enthusiasm for the work.

Moreover, in this embodiment, since the controlling part 20 of the server device 2 is provided with the inviting module 27 which causes the display unit 35 to display the invitation for participation in the painting work, the operator can easily participate in the painting work by visually recognizing the invitation displayed on the display screen 35*a* of the display unit 35.

Moreover, in this embodiment, the disconnecting part 41 of the server device 2 cuts the connection between the game device 3 and the industrial robot 5 in response to the contact from the game device 3 of the operator. Therefore, the operator can leave the remote manipulation whenever he/she wants.

Moreover, in this embodiment, since the game device 3 to which the controller 38 is connected is adopted as the manipulation terminal, the operator does not need to buy a manipulation terminal for exclusive use, and can easily manipulate the industrial robot 5 remotely from home etc.

Other Embodiments

Although in the embodiment described above the industrial robots 5 compete for the painting work as the given work, below, the industrial robots 5 participate in a given competition, such as a sport and a game (match).

Figure 6:
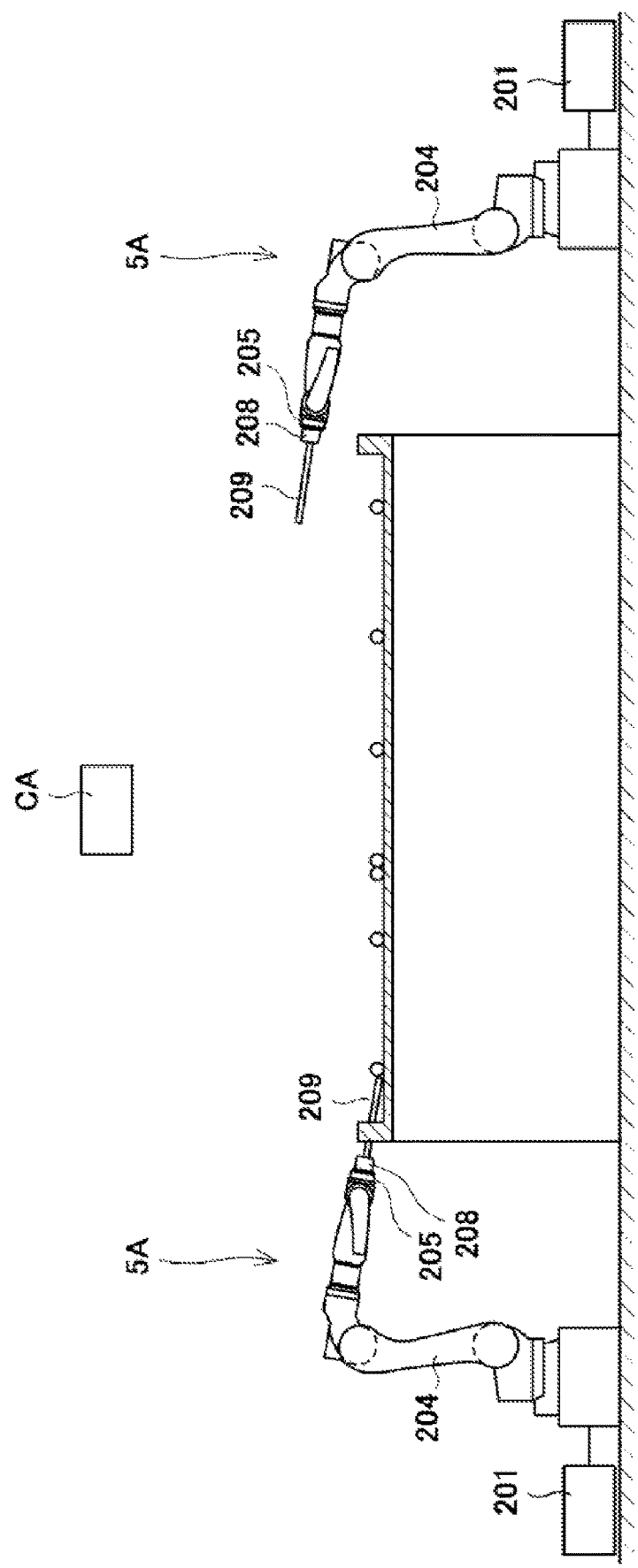
FIG. 6 is a view illustrating a situation in which two robots play billiards.

FIG. 6 is a view illustrating a situation in which two industrial robots 5A play billiards as the given game. Note that in FIG. 6 the same reference characters are given to the same components as FIG. 4 to omit their description.

As illustrated in FIG. 6, a hand 208 is attached to the wrist 205 of the manipulator 204. The hand 208 grips a cue 209 used to strike a billiard ball. By the manipulator 204 operating according to the control by the control device 201, the ball on a billiard table can be stricken by the cue 209. When each industrial robot 5 ends the billiard game, the level determining module 26 determines a manipulation level of the operator based on an evaluation element related to the billiard sports. As the evaluation element, for example, time taken to determine the winner, the number of pocketed balls, and an accuracy of a shot (e.g., the number of balls against which a cue ball directly or indirectly hits), may be adopted. Note that, in FIG. 6, a part of the billiard table is illustrated as a cross-sectional view.

The given game includes, for example, ball games (e.g., tennis and baseball), athletic sports (e.g., running, jumping, and throwing), combat sports (e.g., Kendo and Judo), on-ice or on-snow sports (e.g., skiing and skating), water sports (e.g., swimming and diving), boating sports involving a yacht, a boat, etc., sports involving a vehicle (e.g., a bicycle and an automobile), dance sports, and intellectual sports (e.g., Shogi and Go).

Moreover, although in the embodiments described above the manipulation signals of the industrial robots 5 (5A) are given from the controllers 38 of the plurality of operators, respectively, in other embodiments, the manipulation signals of the industrial robots 5 (5A) are given from at least one manipulation terminal and at least one computer (including an AI), respectively. That is, at least one competitor of the operator is the computer. Although the computer is provided to the server device 2, it is not limited to this, and may be provided to the game device 3 or the industrial robot 5 (5A).

Also according to this, the interest on the industrial robot 5 (5A) can be improved compared to before similarly to the embodiments described above. Therefore, the number of people who manipulate the industrial robot (5A) increases, and the spread of the industrial robot 5 (5A) is expected to be accelerated.

Moreover, the industrial robots 5 (5A) of the embodiments may be configured to be self-propelled robots. Thus, moving ranges of the industrial robots 5 (5A) can be widened.

Moreover, the level determining module 26 may determine the manipulation level of the operator based on the number of the same series of operations of the controller 38, repeated by the operator within a given period of time. This is based on that, generally, as the number of the same series of operations of the controller 38 repeated within the given time period increases, the manipulation level is considered to be high. Therefore, the manipulation skill of the operator can be grasped highly accurately.

DESCRIPTION OF REFERENCE CHARACTERS

1 Robot Manipulation System
2 Server Device (Intermediation Device)
3 Game Device (Manipulation Terminal)
4 Communication Network
5, 5A Industrial Robot
6 Game Observing Device
26 Level Determining Module
27 Inviting Module
28 Measuring Module
31 Controlling Part
35 Display Unit
38 Controller (Manipulation Terminal)
40 Accepting Module
41 Disconnecting Module
CA Imaging Device

What is claimed is:

1. An intermediation device, wherein the intermediation device is adapted to execute processings of:
   receiving, from at least two manipulation terminals, or from at least one manipulation terminal and at least one computer, manipulation signals for manipulating at least two industrial robots;
   causing the at least two industrial robots to perform a given work or a given game based on the manipulation signals;
   causing a display unit held by an operator of at least one of the manipulation terminals to display an image of a site of the work or the game performed by the at least two industrial robots, the image being captured by an imaging device;
   causing the display unit of the operator to display a host screen configured to invite participation in the work or the game when the at least two manipulation terminals are connected to a communication network to communicate with the intermediation device; and
   determining a manipulation skill level of the operator relating to the work or the game based on a given evaluation element indicating a number of a same series of operations of the manipulation terminal repeated by the operator within a given period of time.

2. The intermediation device of claim 1, wherein the intermediation device receives an evaluation from a game observing device configured to evaluate the work or the game performed by the industrial robot, and determines a manipulation level of the operator based on the evaluation.

3. The intermediation device of claim 1, wherein the intermediation device accepts participation of the operator in the work or the game, and connects the manipulation terminal to the industrial robot.

4. The intermediation device of claim 1, wherein the intermediation device disconnects the manipulation terminal of the operator from the industrial robot according to a contact from the manipulation terminal.

5. The intermediation device of claim 1, wherein the intermediation device causes the display unit to display an image of the site including all of the industrial robots.

6. The intermediation device of claim 1, wherein the intermediation device receives the manipulation signal from a game device to which a controller is connected, as the manipulation terminal.

7. An intermediating method, comprising the steps of:
receiving, from at least two manipulation terminals, or from at least one manipulation terminal and at least one computer, manipulation signals for manipulating at least two industrial robots;
causing the at least two industrial robots to perform a given work or a given game based on the manipulation signals;
causing a display unit held by an operator of at least one of the manipulation terminals to display an image of a site of the work or the game performed by the at least two industrial robots, the image being captured by an imaging device;
causing the display unit of the operator to display a host screen configured to invite participation in the work or the game when the at least two manipulation terminals are connected to a communication network to communicate with the intermediation device; and
determining a manipulation skill level of the operator relating to the work or the game based on a given evaluation element indicating a number of a same series of operations of the manipulation terminal repeated by the operator within a given period of time.

8. The intermediating method of claim 7, comprising receiving an evaluation from a game observing device configured to evaluate the work or the game performed by the industrial robot, and determining a manipulation level of the operator based on the evaluation.

9. The intermediating method of claim 7, wherein the intermediating method includes accepting participation of the operator in the work or the game, and connecting the manipulation terminal to the industrial robot.

10. The intermediating method of claim 7, wherein the intermediating method includes disconnecting the manipulation terminal of the operator from the industrial robot according to a contact from the manipulation terminal.

11. The intermediating method of claim 7, wherein the intermediating method includes causing the display unit to display an image of the site including all of the industrial robots.

12. The intermediating method of claim 7, wherein the intermediating method includes receiving the manipulation signal from a game device to which a controller is connected, as the manipulation terminal.

13. An intermediation device, comprising:
a receiver configured to receive, from at least two manipulation terminals, or from at least one manipulation terminal and at least one computer, manipulation signals for manipulating at least two industrial robots;
a controller configured to
cause the at least two industrial robots to perform a given work or a given game based on the manipulation signals;
cause a display unit held by an operator of at least one of the manipulation terminals to display an image of a site of the work or the game performed by the at least two industrial robots, the image being captured by an imaging device;
cause the display unit of the operator to display a host screen configured to invite participation in the work or the game when the at least two manipulation terminals are connected to a communication network to communicate with the intermediation device; and
determine a manipulation skill level of the operator relating to the work or the game based on a given evaluation element indicating a number of a same series of operations of the manipulation terminal repeated by the operator within a given period of time.

14. The intermediation device of claim 13, wherein the intermediation device receives an evaluation from a game observing device configured to evaluate the work or the game performed by the industrial robot, and the controller is configured to determine a manipulation level of the operator based on the evaluation.

15. The intermediation device of claim 13, wherein the controller is configured to accept participation of the operator in the work or the game, and control the intermediation device to connect the manipulation terminal to the industrial robot.

16. The intermediation device of claim 13, wherein the controller is configured to control the intermediation device to disconnect the manipulation terminal of the operator from the industrial robot according to a contact from the manipulation terminal.

17. The intermediation device of claim 13, wherein the controller is configured to cause the display unit to display an image of the site including all of the industrial robots.

* * * * *